(12) United States Patent
De Groot (10) Patent No.: US 8,072,611 B2
(45) Date of Patent: Dec. 6, 2011

(54) INTERFEROMETRIC ANALYSIS OF UNDER-RESOLVED FEATURES

(75) Inventor: Peter De Groot, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 552 days.

(21) Appl. No.: 12/248,613

(22) Filed: Oct. 9, 2008

(65) Prior Publication Data

US 2009/0147268 A1    Jun. 11, 2009

Related U.S. Application Data

(60) Provisional application No. 60/979,738, filed on Oct. 12, 2007.

(51) Int. Cl.
*G01B 11/02* (2006.01)
*G01B 9/02* (2006.01)

(52) U.S. Cl. ........................................ 356/511; 356/521

(58) Field of Classification Search .......... 356/511–513, 356/521

See application file for complete search history.

(56) References Cited

U.S. PATENT DOCUMENTS

| | | |
|---|---|---|
| 2,612,074 A | 9/1952 | Mirau |
| 4,188,122 A | 2/1980 | Massie et al. |
| 4,199,219 A | 4/1980 | Suzuki et al. |
| 4,340,306 A | 7/1982 | Balasubramanian |
| 4,355,903 A | 10/1982 | Sandercock |
| 4,523,846 A | 6/1985 | Breckinridge et al. |
| 4,576,479 A | 3/1986 | Downs |
| 4,583,858 A | 4/1986 | Lebling et al. |
| 4,618,262 A | 10/1986 | Maydan et al. |
| 4,639,139 A | 1/1987 | Wyant et al. |
| 4,660,980 A | 4/1987 | Takabayashi et al. |
| 4,710,642 A | 12/1987 | McNeil |
| 4,806,018 A | 2/1989 | Falk |
| 4,818,110 A | 4/1989 | Davidson |
| 4,869,593 A | 9/1989 | Biegen |
| 4,923,301 A | 5/1990 | White |

(Continued)

FOREIGN PATENT DOCUMENTS

DE    4108944    9/1992

(Continued)

OTHER PUBLICATIONS

Abdulhalim, "Spectroscopic interference microscopy technique for measurement of layer parameters", Meas. Sci. Technol., vol. 12, pp. 1996-2001 (2001).

(Continued)

*Primary Examiner* — Michael A Lyons
(74) *Attorney, Agent, or Firm* — Fish & Richardson P.C.

(57) ABSTRACT

In certain aspects, disclosed methods include directing test light reflected from an object to form an image of the object on a detector, where the object includes a diffractive structure. The test light at the detector includes both specularly and non-specularly reflected light from the diffractive structure, and the diffractive structure is under-resolved in the image. The method further includes directing reference light to interfere with the test light at the detector where the reference and test light being derived from a common source, varying an optical path length difference between the test and reference light, acquiring an interference signal from the detector while varying the optical path length difference, and determining information about the diffractive structure based on the interference signal and on predetermined information derived from a mathematical model of light reflection from a model diffractive structure.

20 Claims, 3 Drawing Sheets

U.S. PATENT DOCUMENTS

| | | | |
|---|---|---|---|
| 4,948,253 A | 8/1990 | Biegen | |
| 4,964,726 A | 10/1990 | Kleinknecht et al. | |
| 4,999,014 A | 3/1991 | Gold et al. | |
| 5,042,949 A | 8/1991 | Greenberg et al. | |
| 5,042,951 A | 8/1991 | Gold et al. | |
| 5,073,018 A | 12/1991 | Kind et al. | |
| 5,112,129 A | 5/1992 | Davidson et al. | |
| 5,129,724 A | 7/1992 | Brophy et al. | |
| 5,133,601 A | 7/1992 | Cohen et al. | |
| 5,135,307 A | 8/1992 | de Groot et al. | |
| 5,153,669 A | 10/1992 | de Groot | |
| 5,164,790 A | 11/1992 | McNeil et al. | |
| 5,166,751 A | 11/1992 | Massig | |
| 5,173,746 A | 12/1992 | Brophy | |
| 5,194,918 A | 3/1993 | Kino et al. | |
| 5,241,369 A | 8/1993 | McNeil et al. | |
| 5,301,010 A | 4/1994 | Jones et al. | |
| 5,355,221 A | 10/1994 | Cohen et al. | |
| 5,384,717 A | 1/1995 | Ebenstein | |
| 5,386,119 A | 1/1995 | Ledger | |
| 5,390,023 A | 2/1995 | Biegen | |
| 5,398,113 A | 3/1995 | de Groot | |
| 5,402,234 A | 3/1995 | Deck | |
| 5,459,564 A | 10/1995 | Chivers | |
| 5,471,303 A | 11/1995 | Ai et al. | |
| 5,481,811 A | 1/1996 | Smith | |
| 5,483,064 A | 1/1996 | Frey et al. | |
| 5,539,571 A | 7/1996 | Cabib et al. | |
| 5,543,841 A | 8/1996 | Kanamori | |
| 5,555,471 A | 9/1996 | Xu et al. | |
| 5,587,792 A | 12/1996 | Nishizawa et al. | |
| 5,589,938 A | 12/1996 | Deck | |
| 5,602,643 A | 2/1997 | Barrett | |
| 5,633,714 A | 5/1997 | Nyyssonen | |
| 5,640,270 A | 6/1997 | Aziz et al. | |
| 5,703,692 A | 12/1997 | McNeil et al. | |
| 5,757,502 A | 5/1998 | Weling | |
| 5,774,224 A | 6/1998 | Kerstens | |
| 5,777,740 A | 7/1998 | Lacey et al. | |
| 5,777,742 A | 7/1998 | Marron | |
| 5,784,164 A | 7/1998 | Deck et al. | |
| 5,856,871 A | 1/1999 | Cabib et al. | |
| 5,867,276 A | 2/1999 | McNeil et al. | |
| 5,880,838 A | 3/1999 | Marx et al. | |
| 5,900,633 A | 5/1999 | Solomon et al. | |
| 5,912,741 A | 6/1999 | Carter et al. | |
| 5,923,423 A | 7/1999 | Sawatari et al. | |
| 5,953,124 A | 9/1999 | Deck | |
| 5,956,141 A | 9/1999 | Hayashi | |
| 5,963,329 A | 10/1999 | Conrad et al. | |
| 6,028,670 A | 2/2000 | Deck | |
| 6,160,621 A | 12/2000 | Perry et al. | |
| 6,242,739 B1 | 6/2001 | Cherkassky | |
| 6,249,351 B1 | 6/2001 | de Groot | |
| 6,259,521 B1 | 7/2001 | Miller et al. | |
| 6,275,297 B1 | 8/2001 | Zalicki | |
| 6,377,349 B1 | 4/2002 | Fercher | |
| 6,381,009 B1 | 4/2002 | McGahan | |
| 6,392,749 B1 | 5/2002 | Meeks et al. | |
| 6,417,109 B1 | 7/2002 | Jordan et al. | |
| 6,429,943 B1 | 8/2002 | Opsal et al. | |
| 6,449,066 B1 | 9/2002 | Arns et al. | |
| 6,483,580 B1 | 11/2002 | Xu et al. | |
| 6,500,591 B1 | 12/2002 | Adams | |
| 6,507,405 B1 | 1/2003 | Grek et al. | |
| 6,525,825 B2 | 2/2003 | de Groot | |
| 6,545,761 B1 | 4/2003 | Aziz et al. | |
| 6,545,763 B1 | 4/2003 | Kim et al. | |
| 6,590,656 B2 | 7/2003 | Xu et al. | |
| 6,597,460 B2 | 7/2003 | de Groot et al. | |
| 6,611,330 B2 | 8/2003 | Lee et al. | |
| 6,624,894 B2 | 9/2003 | Olszak et al. | |
| 6,633,389 B1 | 10/2003 | Poris et al. | |
| 6,633,831 B2 | 10/2003 | Nikoonahad et al. | |
| 6,636,322 B1 | 10/2003 | Terashita | |
| 6,694,284 B1 | 2/2004 | Nikoonahad et al. | |
| 6,714,307 B2 | 3/2004 | de Groot et al. | |
| 6,721,094 B1 | 4/2004 | Sinclair et al. | |
| 6,741,357 B2 | 5/2004 | Wang et al. | |
| 6,741,360 B2 | 5/2004 | D'Agraives et al. | |
| 6,775,006 B2 | 8/2004 | de Groot et al. | |
| 6,775,009 B2 | 8/2004 | Hill | |
| 6,798,511 B1 | 9/2004 | Zhan et al. | |
| 6,822,745 B2 | 11/2004 | de Groot et al. | |
| 6,856,384 B1 | 2/2005 | Rovira | |
| 6,888,638 B1 | 5/2005 | Hill | |
| 6,891,627 B1 | 5/2005 | Levy et al. | |
| 6,909,509 B2 | 6/2005 | DeGroot | |
| 6,925,860 B1 | 8/2005 | Poris et al. | |
| 6,940,604 B2 | 9/2005 | Jung et al. | |
| 6,956,658 B2 | 10/2005 | Meeks et al. | |
| 6,956,660 B2 | 10/2005 | Meeks et al. | |
| 6,985,232 B2 | 1/2006 | Sezginer | |
| 6,989,905 B2 | 1/2006 | de Groot | |
| 6,999,180 B1 | 2/2006 | Janik et al. | |
| 7,012,700 B2 | 3/2006 | de Groot et al. | |
| 7,018,271 B2 | 3/2006 | Wiswesser et al. | |
| 7,038,850 B2 | 5/2006 | Chang et al. | |
| 7,046,371 B2 | 5/2006 | de Lega et al. | |
| 7,061,623 B2 | 6/2006 | Davidson | |
| 7,068,376 B2 | 6/2006 | de Groot | |
| 7,088,451 B2 | 8/2006 | Sezginer | |
| 7,102,761 B2 | 9/2006 | de Lega et al. | |
| 7,106,454 B2 | 9/2006 | de Groot et al. | |
| 7,119,909 B2 | 10/2006 | Unruh et al. | |
| 7,139,081 B2 | 11/2006 | de Groot | |
| 7,139,083 B2 | 11/2006 | Fielden et al. | |
| 7,142,311 B2 | 11/2006 | de Lega | |
| 7,177,030 B2 | 2/2007 | Leizerson | |
| 7,205,518 B2 | 4/2007 | Neuvonen | |
| 7,239,398 B2 | 7/2007 | de Groot et al. | |
| 7,271,918 B2 | 9/2007 | de Groot et al. | |
| 7,283,248 B2 | 10/2007 | Hill | |
| 7,289,225 B2 | 10/2007 | de Groot | |
| 7,298,494 B2 | 11/2007 | de Groot | |
| 7,304,747 B2 | 12/2007 | de Lega | |
| 7,315,382 B2 | 1/2008 | de Groot | |
| 7,324,210 B2 | 1/2008 | de Groot et al. | |
| 7,324,214 B2 | 1/2008 | de Groot et al. | |
| 7,428,057 B2 | 9/2008 | De Lega et al. | |
| 7,538,891 B1 * | 5/2009 | Mello et al. | 356/520 |
| 2002/0015146 A1 | 2/2002 | Meeks et al. | |
| 2003/0048458 A1 | 3/2003 | Mieher et al. | |
| 2003/0075721 A1 | 4/2003 | Li | |
| 2003/0197871 A1 | 10/2003 | de Groot | |
| 2004/0027576 A1 | 2/2004 | de Groot et al. | |
| 2004/0075843 A1 | 4/2004 | Marron et al. | |
| 2004/0085544 A1 | 5/2004 | de Groot et al. | |
| 2004/0185582 A1 | 9/2004 | Kueny | |
| 2004/0189999 A1 | 9/2004 | de Groot et al. | |
| 2004/0233442 A1 | 11/2004 | Mieher et al. | |
| 2004/0233444 A1 | 11/2004 | Mieher et al. | |
| 2004/0246493 A1 | 12/2004 | Kim et al. | |
| 2005/0024773 A1 | 2/2005 | Lille | |
| 2005/0057757 A1 | 3/2005 | de Lega et al. | |
| 2005/0068540 A1 | 3/2005 | de Groot et al. | |
| 2005/0073692 A1 | 4/2005 | de Groot et al. | |
| 2005/0078318 A1 | 4/2005 | de Groot | |
| 2005/0078319 A1 | 4/2005 | de Groot | |
| 2005/0088663 A1 | 4/2005 | de Groot et al. | |
| 2005/0146727 A1 | 7/2005 | Hill | |
| 2005/0179911 A1 | 8/2005 | Boomgarden et al. | |
| 2005/0225769 A1 | 10/2005 | Bankhead et al. | |
| 2005/0237534 A1 | 10/2005 | Deck | |
| 2005/0237537 A1 | 10/2005 | Leizerson et al. | |
| 2006/0012582 A1 | 1/2006 | de Lega | |
| 2006/0072104 A1 | 4/2006 | Engel et al. | |
| 2006/0119841 A1 | 6/2006 | Saunders et al. | |
| 2006/0158657 A1 | 7/2006 | de Lega et al. | |
| 2006/0158658 A1 | 7/2006 | de Lega et al. | |
| 2006/0158659 A1 | 7/2006 | de Lega et al. | |
| 2006/0170932 A1 | 8/2006 | Hayashi et al. | |
| 2006/0187465 A1 | 8/2006 | de Groot | |
| 2006/0203253 A1 * | 9/2006 | Kato | 356/521 |
| 2006/0262321 A1 | 11/2006 | de Groot | |
| 2007/0008551 A1 | 1/2007 | Tang | |
| 2007/0046953 A1 | 3/2007 | de Groot et al. | |

| | | |
|---|---|---|
| 2007/0081167 A1 | 4/2007 | de Groot et al. |
| 2007/0086013 A1 | 4/2007 | de Lega et al. |
| 2007/0091317 A1 | 4/2007 | Freischlad et al. |
| 2007/0091318 A1 | 4/2007 | Freischlad et al. |
| 2007/0091940 A1 | 4/2007 | Jameson |
| 2007/0097380 A1 | 5/2007 | de Groot et al. |
| 2007/0127036 A1 | 6/2007 | Liao et al. |
| 2007/0139656 A1 | 6/2007 | Wan |
| 2007/0247637 A1 | 10/2007 | de Groot |
| 2008/0018901 A1 | 1/2008 | de Groot |
| 2008/0088849 A1 | 4/2008 | de Lega et al. |
| 2008/0174784 A1 | 7/2008 | de Lega et al. |

FOREIGN PATENT DOCUMENTS

| | | |
|---|---|---|
| DE | 4309056 | 9/1994 |
| EP | 0 397 388 | 11/1990 |
| EP | 0 549 166 | 6/1993 |
| EP | 0 617 255 | 9/1994 |
| EP | 0 929 094 | 7/1999 |
| GB | 2385417 | 8/2003 |
| JP | 8327327 | 12/1996 |
| JP | 09-218016 | * 8/1997 |
| JP | 2000121317 | 4/2000 |
| JP | 2000-180124 | * 6/2000 |
| JP | 2001-141652 | * 5/2001 |
| JP | 2001-272603 | * 10/2001 |
| KR | 1020000061037 | 10/2000 |
| WO | 93/24805 | 12/1993 |
| WO | WO 94/00733 | 1/1994 |
| WO | 95/09343 | 4/1995 |
| WO | 97/44633 | 11/1997 |
| WO | 02/082008 | 10/2002 |
| WO | 03/062802 | 7/2003 |
| WO | 2004/023071 | 3/2004 |
| WO | WO 2005/029192 | 3/2005 |

OTHER PUBLICATIONS

Akcay et al., "Spectral shaping to improve the point spread function in optical coherence tomography", Optics Letters, vol. 28, No. 20, pp. 1921-1923 (Oct. 15, 2003).

Azzam et al, "Ellipsometric function of a film-substrate system: Applications to the design of reflection-type optical devices and to ellipsometry", Journal of the Optical Society of America, vol. 5, No. 3, pp. 252-260 (1975).

Azzam et al., "Reflection and Transmission of Polarized Light by Stratified Planar Structures", Ellipsometry and Polarized Light, Elsevier Science B.V. ISBN 0 444 87016 4 (Paperback) pp. 267-363 (1987).

Bashkansky et al., "Signal Processing for Improving Field Cross-correlation Function in Optical Coherence Tomography", Supplement to Optics & Photonics News, 9(5) (May 1998).

Berman, M., et al., "Review of In Situ & In-line Detection for CMP Applications", Semiconductor Fabtech—8th Edition, pp. 267-274 (1998).

Biegen, "Determination of the Phase Change on Reflection from Two-beam Interference," Optics Letters, 19:21:1690-1692, Nov. 1, 1994.

Bishop, et al., "Grating line shape characterization using scatterometry," SPIE 1545, 64-73 (1991).

Bosseboeuf et al., Application of microscopic interferometry techniques in the MEMS field, Proc. SPIE, 5145, pp. 1-16 (2003).

Chim, S. S. C. and Kino, G. S., "Three-Dimensional Image Realization in Interference Microscopy", Applied Optics, vol. 31, No. 14 (May 10, 1992).

Creath, "Step height measurement using two-wavelength phase-shifting interferometry", Applied Optics, vol. 26, No. 14, pp. 2810-2816 (Jul. 15, 1987).

Danielson et al., "Absolute Optical Ranging Using Low Coherence Interferometry," Applied Optics, 30:21:2975-2979, Jul. 20, 1991.

Davidson et al., "An Application of Interference Microscopy to Integrated Circuit Inspection and Metrology", Proceedings of SPIE, vol. 775, pp. 233-247 (1987).

de Groot et al., "Angle-resolved three-dimensional analysis of surface films by coherence scanning interferometry", Optics Letters, vol. 32, No. 12, pp. 1638-1640 (Jun. 15, 2007).

de Groot et al., "Determination of fringe order in white-light interference microscopy", Appl. Opt., 41(22) pp. 4571-4578 (2002).

de Groot et al., "Signal modeling for low coherence height-scanning interference microscopy", Applied Optics, vol. 43 No. 25, pp. 4821-4830 (Sep. 1, 2004).

de Groot et al., "Signal modeling for modern interference microscopes", SPIE Proceedings vol. 5457, pp. 26-34 (2004).

de Groot et al.; "Three-dimensional imaging by sub-Nyquist sampling of white-light interfergrams"; Optics Letters vol. 18, No. 17; pp. 1462-1464, Sep. 1, 1993.

de Groot, "Extending the unambiguous range of two-color interferometers", Applied Optics, vol. 33, No. 25, pp. 5948-5953 (Sep. 1, 1994).

de Groot, "Derivation of algorithms for phase-shifting interferometry using the concept of a data-sampling window", Appl. Opt., 34(22), p. 4723-4730 (1995).

de Groot, "Three-color laser-diode interferometer", Applied Optics, vol. 30, No. 25, pp. 3612-3616 (Sep. 1, 1991).

de Groot, P., "Phase-shift calibration errors in interometers with spherical Fizeua cavities," Applied Optics, vol. 34:16, pp. 2856-2863 (Jun. 1, 1995).

de Lega, X., et al., "Optical topography measurement of patterned wafers," American Institute of Physics Conference Proceedings, vol. 788, pp. 432-436 (2005).

Debnath, S.K., et al., "Spectrally resolved phase-shifting interferometry of transparent thin films: sensitivity of thickness measurements," Appl. Opt. 45, 34 8636-8640 (2006).

Deck et al., "Two-color light-emitting-diode source for high-precision phase-shifting interferometry", Optics Letters, vol. 18, No. 22, pp. 1899-1901 (Nov. 15, 1993).

Dresel et al., "Three Dimensional Sensing of Rough Surfaces by Coherence Radar," Applied Optics, 31:7:919-925, Mar. 1, 1992.

Encyclopedia of Laser Physics and Technology, >>http://www.rp-photonics.com/coherence.html<< Copyright Dr. Rüdiger Paschotta, RP Photonics Consulting GmbH, Mar. 14, 2008.

Encyclopedia of Laser Physics and Technology, >>http://www.rp-photonics.com/single_mode_fibers.html.<< Copyright Dr. Rüdiger Paschotta, RP Photonics Consulting GmbH, Mar. 14, 2008.

Encyclopedia of Laser Physics and Technology, >>http://www.rp-photonics.com/photonic_crystal_fibers.html<< Copyright Dr. Rüdiger Paschotta, RP Photonics Consulting GmbH, Mar. 14, 2008.

Encyclopedia of Laser Physics and Technology, >>http://www.rp-photonics.com/supercontinuum_generation.html<< Copyright Dr. Rüdiger Paschotta, RP Photonics Consulting GmbH, Mar. 14, 2008.

Feke, Gilbert D. et al., "Interferometric back focal plane microellipsometry", Applied Optics, vol. 37, No. 10, pp. 1796-1802 (Apr. 1, 1998).

Flournoy et al., "White-light interferometric thickness gauge", Appl. Opt., 11(9), pp. 1907-1915 (1972).

Gale et al., "Linnik microscope imaging of integrated circuit structures", Applied Optics vol. 35, No. 1, pp. 131-148 (Jan. 1, 1996).

Ghiglia et al., "Quality-Guided Path Following", Two-Dimensional Phase Unwrapping—Theory, Algorithms and Software, John Wiley & Sons publishers, ISBN 0-471-24935-1, pp. 122-136 (1998).

Greivenkamp, "Generalized data reduction for heterodyne interferometry", Opt. Eng., vol. 23 No. 4, pp. 350-352 (Jul./Aug. 1984).

Hausler et al., "Coherence Radar and Spectral Radar—New Tools for Dermatological Diagnosis", Journal of Biomedical Optics, vol. 3, No. 1, pp. 21-31 (Jan. 1998).

Hecht, "Basics of Coherence Theory," Optics, 2nd Ed., Addison Wesley, pp. 516-517 (1987).

Holmes et al., "Scanning microellipsometry for extraction of true topography", Electronics Letters, vol. 31, No. 5, pp. 358-359 (Mar. 2, 1995).

Kim, Seung-Woo et al., "Thickness-profile measurement of transparent thin-film layers by white-light scanning interferometry", Applied Optics, vol. 38, No. 28, pp. 5968-5973 (Oct. 1, 1999).

Kino et al., "Mirau Correlation Microscope," Applied Optics, 29:26:3775-3783, Sep. 10, 1990.

Kleinknecht, et al., "Linewidth measurement on IC masks and wafers by grating test patterns," Appl. Opt. 19(4), 523-533 (1980).

Kohlhaas, A. Fromchen, C. and Brinkmeyer, E., "High-Resolution OCDR for Testing Integrated-Optical Waveguides: Dispersion-Corrupted Experimental Data Corrected by a Numerical Algorithm", Journal of Lightwave Technology, vol. 9, No. 11 (Nov. 1991).

Kujawinska, Malgorzata, "Spatial Phase Measurement Methods", Interferogram Analysis: Digital Fringe Pattern Measurement Techniques, IOP Publishing Ltd., pp. 141-193 (1993).

Larkin, "Efficient nonlinear algorithm for envelope detection in white light interferometry", J. Opt. Soc. Am A4, pp. 832-843 (1996).

Lee et al., "Profilometry with a coherence scanning microscope", Appl. Opt., 29(26), pp. 3784-3788 (1990).

Lee-Bennett, "Advances in non-contacting surface metrology", OF&T Workshop, paper OTuC1 (2004).

Leonhardt et al., "Micro-Ellipso-Height-Profilometry", Optics Communications, vol. 80, No. 3, 4, pp. 205-209 (Jan. 1, 1991).

Liu et al., "Common path interferometric microellipsometry", SPIE, vol. 2782, pp. 635-645 (1996).

Lyakin et al., "The interferometric system with resolution better than coherence length for determination of geometrical thickness and refractive index of a layer object", Proceedings of the SPIE, vol. 4956, pp. 163-169 (2003).

Moharam and Gaylord, "Rigorous coupled-wave analysis of planar-grating diffraction," JOSA, 71(7), 811 (1981).

Morgan, "Least-Squares estimation in phase-measurement interferometry", Apt. Let., 7(8), pp. 368-370 (1982).

Naqvi, et al., "Linewidth measurement of gratings on photomasks: a simple technique," Appl. Opt., 31(10), 1377-1384 (1992).

Ngoi et al., "Phase-shifting interferometry immune to vibration", Applied Optics, vol. 40, No. 19, pp. 3211-3214 (2001).

Novak et al., "Template-based software for accurate MEMS characterization", Proceedings of SPIE, Fol. 4980, pp. 75-80 (2003).

Onodera et al., "Two-wavelength interferometry that uses a Fourier-transform method", Applied Optics, vol. 37, No. 34, pp. 7988-7994 (Dec. 1, 1998).

Oppenheim et al., "10.3: The time-dependent Fourier Transform", Discrete-Time Signal Processing, 2.sup.nd Edition, pp. 714-722 (Prentice Hall, New Jersey). (1999).

Park et al., "Direct quadratic polynomial fitting for fringe peak detection of white light scanning interferograms", Opt. Eng, 39(4), pp. 952-959 (2000).

Petitgrand, S. et al., "Mesures 3D de topographies et de vibrations a l'echelle (sub)micrometrique par microscopie optique interferometrique", Proc. Club CMOI, Methodes et Techniques Optiques pour l'Industrie (2002).

Peng, S.T., et al., "Theory of Periodic Dielect Waveguides," IEEE Trans Microwave Theory and Technique MTT-23(1), 123-133 (1975).

Pfortner et al., "Red-green-blue interferometer for the metrology of discontinuous structures", Applied Optics, vol. 42, No. 4, pp. 667-673 (Feb. 1, 2003).

Pluta, Maksymilian, "Advanced Light Microscopy", vol. 3, (Elsevier, Amsterdam) pp. 265-271 (1993).

Press et al., "Linear Correlation", Numerical Recipes in C, Cambridge University Press, 2.sup.nd Edition, pp. 636-639 (1992).

Raymond, C.J., "Scatterometry for Semiconductor Metrology," in Handbook of silicon semiconductor metrology, A.J. Deibold, Ed. (Marcel Dekker, Inc., New York 2001).

Raymond, et al., "Scatterometry for CD measurements of etched structures," SPIE 2725, 720-728 (1996).

Rosencwaig, Allan et al., "Beam profile reflectometry: A new technique for dielectric film measurements", Applied Physics Letters, vol. 60, No. 11, pp. 1301-1303 (Mar. 16, 1992).

Sandoz et al., "High-resolution profilometry by using phase calculation algorithms for spectroscopic analysis of white-light interferograms", Journal of Modern Optics, vol. 43, No. 4 , pp. 701-708 (1996).

Sandoz et al., "Optical implementation of frequency domain analysis for white light interferometry", Proceedings SPIE, vol. 2545, pp. 221-228 (Jun. 1995).

Sandoz et al., "Processing of white light correlograms: simultaneous pahse and envelope measurements by wavelet transformation", SPIE, 3098, pp. 73-82 (1997).

Sandoz, Patrick "Wavelet transform as a processing tool in white-light interferometry", Optics Letters, vol. 22, No. 14, pp. 1065-1067 (Jul. 15, 1997).

Schmit, J. et al., "Extended averaging technique for derivation of error-compensating algorithms in phase-shifting interferometry," Applied Optics, vol. 34:19, pp. 3610-3619 (Jul. 1, 1995).

Schnell et al., "Dispersive white-light interferometry for absolute distance measurement with dielectric multilayer systems on the target", Optics Letters, vol. 21, No. 7, pp. 528-530 (Apr. 1996).

Schwider et al., "Dispersive interferometric profilometer", Optics Letters, vol. 19, No. 13, pp. 995-997 (Jul. 1994).

See et al., "Scanning optical microellipsometer for pure surface profiling", Applied Optics, vol. 35, No. 34, pp. 6663-6668, cited by other (1993).

Shatalin, S. V. et al., "Reflection conoscopy and micro-ellipsometry of isotropic thin film structures", Journal of Microscopy, vol. 179, Part 3, pp. 241-252 (Sep. 1995).

Sheppard et al., "Effect of numerical aperture on interference fringe spacing", Applied Optics, vol. 34, No. 22, pp. 4731-4734 (Aug. 1, 1995).

Totzeck, "Numerical simulation of high-NA quantitative polarization microscopy and corresponding near-fields", Optik, vol. 112, No. 9, pp. 399-406 (2001).

Tripathi et al., "Spectral shaping for non-Gaussian source spectra in optical coherence tomography", Optics Letters, vol. 27, No. 6, pp. 406-408 (2002).

Tzannes et al., Measurement of the modulation transfer function of infrared cameras, Optical Engineering, vol. 34, No. 6, pp. 1808-1817, (Jun. 1995).

Willenborg et al, "A novel micro-spot dielectric film thickness measurement system", SPIE, vol. 1594, pp. 322-333 (1991).

Wyant, "Phase shifting interferometry" (1998).

Youngquist, R. C. Carr, S. and Davies, D. E. N., "Optical Coherence-Domain Reflectometry: a New Optical Evaluation Technique", Optical Letters, vol. 12, No. 3 (Mar. 1987).

Zhan, Q., et al., "Measurement of surface features beyond the diffraction limit with an imaging ellipsometer," Opt. Lett. 27, 821-823 (2002).

* cited by examiner

INTERFEROMETRIC ANALYSIS OF UNDER-RESOLVED FEATURES

CROSS REFERENCE TO RELATED APPLICATIONS

This application claims priority from U.S. Provisional Application Ser. No. 60/979,738, filed on Oct. 12, 2007 and entitled "INTERFEROMETRIC SCATTEROMETRY APPARATUS AND METHOD WITH SIMULTANEOUS MULTIPLE-ANGLE ANALYSIS OF SPECULAR AND NON-SPECULAR DIFFRACTED LIGHT," which is incorporated herein by reference in its entirety.

TECHNICAL FIELD

This disclosure relates to scanning interferometry, and more particularly to profiling surface features.

BACKGROUND

Interferometric techniques are commonly used to measure the profile of a surface of an object. To do so, an interferometer combines a measurement wavefront reflected from the surface of interest with a reference wavefront reflected from a reference surface to produce an interferogram. Fringes in the interferogram are indicative of spatial variations between the surface of interest and the reference surface.

A scanning interferometer scans the optical path length difference (OPD) between the reference and measurement legs of the interferometer over a range comparable to, or larger than, the coherence length of the interfering wavefronts, to produce a scanning interferometry signal for each camera pixel (herein also referred to as an interference signal) used to measure the interferogram. A limited coherence length can be produced, for example, by using a white-light source, which is referred to as scanning white light interferometry (SWLI). An interference signal is typically characterized by a sinusoidal carrier modulation (referred to as interference fringes). For SWLI, the sinusoidal carrier modulation is typically modified by a bell-shaped fringe-contrast envelope. In general, a SWLI-signal has a few fringes, modulated by the bell-shaped envelope, localized near the zero optical path length difference (OPD) position. The conventional idea underlying SWLI metrology is to make use of the localization of the fringes to measure surface profiles.

SWLI processing techniques include two principle trends. The first approach is to locate the peak or center of the envelope, assuming that this position corresponds to the zero optical path length difference of a two-beam interferometer for which one beam reflects from the object surface. The second approach is to transform the signal into the frequency domain and calculate the rate of change of phase with wavelength, assuming that an essentially linear slope is directly proportional to object position. See, for example, U.S. Pat. No. 5,398,113 to Peter de Groot. This latter approach is referred to as Frequency Domain Analysis (FDA).

Scanning interferometry can be used to measure surface topography and/or other characteristics of objects having complex surface structures, such as thin film(s), discrete structures of dissimilar materials, or discrete structures that are under-resolved by the optical resolution of an interference microscope. Such measurements are relevant to the characterization of flat panel display components, semiconductor wafer metrology, and in-situ thin film and dissimilar materials analysis. See, e.g., U.S. Patent Publication No. US-2004-0189999-A1 by Peter de Groot et al. entitled "Profiling Complex Surface Structures Using Scanning Interferometry" and published on Sep. 30, 2004, the contents of which are incorporated herein by reference, and U.S. Pat. No. 7,139,081 by Peter de Groot entitled "Interferometry Method for Ellipsometry, Reflectometry, and Scatterometry Measurements, Including Characterization of Thin Film Structures" and issued on Nov. 21, 2006, the contents of which are incorporated herein by reference.

Other techniques for optically determining information about an object include ellipsometry and reflectometry. Ellipsometry determines complex reflectivity of a surface when illuminated at an oblique angle (e.g., 60°) sometimes with a variable angle or with multiple wavelengths. To achieve greater resolution than is readily achievable in a conventional ellipsometer, microellipsometers measure phase and/or intensity distributions in the back focal plane of the objective, also known as the pupil plane, where the various illumination angles are mapped into field positions. Such devices are modernizations of traditional polarization microscopes or "conoscopes," linked historically to crystallography and mineralogy, which employ crossed polarizers and a Bertrand lens to analyze the pupil plane birefringent materials.

Conventional techniques used for surface characterization (e.g., ellipsometry and reflectometry) rely on the fact that the complex reflectivity of an unknown optical interface depends both on its intrinsic characteristics (material properties and thickness of individual layers) and on three properties of the light that is used for measuring the reflectivity: wavelength, angle of incidence, and polarization state. In practice, characterization instruments record reflectivity fluctuations resulting from varying these parameters over known ranges.

Optimization procedures such as least-squares fits are then used to get estimates for the unknown parameters by minimizing the difference between measured reflectivity data and a reflectivity function derived from a model of the optical structure. These derived candidate solutions are often calculated in advance and stored in a library, which is searched to determine the correct solution by a least-squares or equivalent matching and interpolation technique. See, for example, K. P. Bishop et al. "Grating line shape characterization using scatterometry," SPIE 1545, 64-73 (1991) and C. J. Raymond et al., "Scatterometry for CD measurements of etched structures," SPIE 2725, 720-728 (1996).

Detailed modeling such as Rigorous Coupled Wave Analysis solves the inverse problem of discovering the feature structure that generates the observed interference signal observed diffraction effects. See, for example, reference of M. G. Moharam and T. K. Gaylord "Rigorous coupled-wave analysis of planar-grating diffraction," JOSA, 71(7), 811 (1981) and S. S. H. Naqvi et al., "Linewidth measurement of gratings on photomasks: a simple technique," Appl. Opt., 31(10), 1377-1384 (1992).

Analysis of the diffraction patterns from grating test patterns on masks and wafers provides non-contact measurements of linewidth and other feature characteristics associated with process control. See, for example, H. P. Kleinknecht et al., "Linewidth measurement on IC masks and wafers by grating test patterns," Appl Opt. 19(4), 525-533 (1980) and C. J. Raymond, "Scatterometry for Semiconductor Metrology," in Handbook of silicon semiconductor metrology, A. J. Deibold, Ed., Marcel Dekker, Inc., New York, 2001).

SUMMARY

Imaging interferometers can be used to analyze surface structure of a test object. However, using conventional measurement methods, the resolution of the interferometer's imaging optical system is generally a limiting parameter for the size of the surface structure that can be analyzed with the interferometric measurement. Accordingly, where the surface of the test object includes structure that has dimensions smaller than the resolution limit of the optical system, in general, no information about the under-resolved surface structure is provided by a conventional measurement. Nevertheless, under-resolved structures contribute to interferometric measurements through both specular and non-specular reflection of light from the surface. In this disclosure, imaging interferometry systems and methods are described for determining information about such under-resolved surface structure. For example, interference signals obtained using an imaging interferometry system can be compared to a library of modeled signals, where each of the modeled signals in the library corresponds to a different surface structure. As an example, embodiments can include determining parameters of an under-resolved grating on the surface of the test object. Here, each of the modeled signals in the library corresponds to a grating with at least one parameter value that is different from the other modeled signals. Exemplary parameters for gratings include pitch, depth, side-wall angle, etc.

As mentioned previously, under-resolved surface structures may reflect light specularly and non-specularly and thus contribute to an interference signal in a complex manner.

Examples for under-resolved surface structures include grating structures, grating-like structures, and any two or three dimensional structure that is of interest and that generates a contribution of non-specularly reflected light. Moreover, in general, in order to make an accurate comparison, modeled interference signals would also need to account for both specularly and non-specularly reflected light.

In certain embodiments, one can decrease the complexity of the analysis by reducing the contribution of non-specularly reflected light from under-resolved surface structure in a measured interference signal. Accordingly, corresponding modeled signals can be determined based essentially only on specularly reflected light, rather than both specularly and non-specularly reflected light, significantly reducing the computational cost of generating a library of model signals. For example, it is believed that where the interference signal is acquired over a sufficiently large detector area relative to the under-resolved structure, the contribution of non-specularly reflected light from the under-resolved structure to the interference signal can be reduced to negligible levels. Thus, the interference signal can be compared to model interference signals determined based on specularly reflected light only.

The effective area of an imaging detector can be increased from its native detector element (i.e., pixel) size in a variety of ways. For example, an interference signal can be determined by averaging interference signals from multiple adjacent detector elements. Such laterally averaging does not, in general, affect the contribution of specularly reflected light.

Lateral averaging can be achieved in a variety of ways in the generation of the interference signal. For example, one can average the light before its detection by the multi-element detector. This can be done by spatially filtering the interferometer's output beam, e.g., by introducing a spatially mixing optical elements into the imaging optical path. Alternatively, or additionally, one can average detected interference signals by hardware and/or software over an averaging area during the actual detection. This can be done by acquiring a separate interference signal at each detector element and then averaging the acquired signals from each detector element within the averaging area. In some embodiments, one can also acquire an interference signal from the averaging area of the detector by integrating the measured intensity at each detector element for each frame during data acquisition.

In some embodiments, the laterally averaged interference signals are compared to modeled interference signals that neglect the non-specularly reflected light or that model the laterally averaging based on conditions (e.g., averaging areas) as they are present in the measurement.

The comparison can be done for a single interference signal or for multiple interference signals allowing analysis of the surface of the test object at multiple locations (e.g., in one or two dimensions). The interference signal can be generated for light having several different frequencies, polarization states, incident angles, and/or averaging areas.

In one aspect, the invention features methods that include directing test light reflected from an object to form an image of the object on a detector, where the object includes a diffractive structure, the test light at the detector comprises both specularly and non-specularly reflected light from the diffractive structure, and the diffractive structure is under-resolved in the image. The method further includes directing reference light to interfere with the test light at the detector, the reference and test light being derived from a common source, varying an optical path length difference between the test and reference light, acquiring an interference signal from the detector while varying the optical path length difference, and determining information about the diffractive structure based on the interference signal and on predetermined information derived from a mathematical model of light reflection from a model diffractive structure.

In another aspect, the invention features systems that include a detector, an interferometer configured to direct test light reflected from an object having a diffractive structure to the detector to form an image of the object where test light at the detector includes light that is both specularly and non-specularly reflected from the diffractive structure and the diffractive structure is under-resolved in the image, the interferometer being configured to direct reference light to interfere with the test light at the detector, the reference and test light being derived from a common source, and the interferometer being further configured to vary an optical path length difference between the test and reference light. The systems further include an electronic controller in communication with the detector, wherein during operation the electronic controller acquires an interference signal from the detector while the interferometer varies the optical path length difference, wherein the electronic controller comprises predetermined information derived from a mathematical model of light reflection from a model diffractive structure and during operation the electronic controller determines information about the diffractive structure based on the interference signal and the predetermined information.

In another aspect, the invention features methods that include directing test light reflected from an object along a first path to an image plane to form an image of the object on a multi-element detector positioned at the image plane, where the object includes a diffractive structure that is under-resolved in the image, directing reference light along a second path to interfere with the test light at the image plane, the reference and test light being derived from a common source, varying an optical path length difference between the test and reference light, acquiring an interference signal from a plurality of the detector elements while varying the optical path length difference, averaging the interference signals from the plurality of detector elements, thereby creating an averaged interference signal, and determining information about the diffractive structure based on the averaged interference signal and predetermined information derived from a mathematical model of light reflection from a model diffractive structure.

In another aspect, the invention features methods that include directing test light reflected from an object to form an image of the object on a detector, where the object includes a diffractive structure, the test light at the detector includes both specularly and non-specularly reflected light from the diffractive structure, and the diffractive structure is under-resolved in the image. The methods include also directing reference light to interfere with the test light at the image plane where the reference and test light are derived from a common source, monitoring the image while varying an optical path length difference between the test and reference light, and determining information about the diffractive structure based on the monitored image and on predetermined information derived from a mathematical model of light reflection from a model diffractive structure.

In another aspect, the invention features methods that include comparing information derivable from a scanning interferometry signal for a first surface location of a test object to information derived from a mathematical model of light reflected from a model test object. The object includes an under-resolved diffractive structure, the scanning interferometry signal is based on test light that is specularly and non-specularly reflected from the diffractive structure, and the mathematical model includes modeling only light that is specularly reflected from a diffractive structure of the model test object. The methods further include outputting information about the under-resolved diffractive structure based on the comparison. In another aspect, the invention features methods that includes directing test light reflected from an object to form an image of the object on a detector, where the object includes a diffractive structure, the test light is specularly and non-specularly reflected from the diffractive structure, and the diffractive structure is under-resolved in the image. The method further includes directing reference light to interfere with the test light at the detector, the reference and test light being derived from a common source, and varying an optical path length difference between the test and reference light, and acquiring an interference signal from the detector while varying the optical path length difference, wherein a contribution to the interference signal from the non-specularly reflected light is reduced to be negligible relative to a contribution to the interference signal from the specularly reflected light. The method further includes determining information about the diffractive structure based on the interference signal and predetermined information based on a model modeling reflection of light from a diffractive structure model.

In another aspect, the invention features systems that include a detector, an interferometer configured to direct test light reflected from an object to a the detector to form an image of the object and to direct reference light to interfere with the test light at the detector, the reference and test light being derived from a common source, and the interferometer being further configured to vary an optical path length difference between the test and reference light, and an electronic controller in communication with the detector, wherein during operation the electronic controller acquires an interference signal from the detector while the interferometer varies the optical path length difference, wherein a contribution to the interference signal from the non-specularly reflected light is reduced to be negligible relative to a contribution to the interference signal from the specularly reflected light, and determines information about a diffractive structure on the object that is under-resolved in the image based on the interference signal and predetermined information based on a model modeling reflection of light from a diffractive structure model.

In another aspect, the invention features methods that include directing test light reflected from an object to form an image of the object, where the object includes a diffractive structure, the test light is specularly and non-specularly reflected from the diffractive structure, and the diffractive structure is under-resolved in the image. The method further includes directing reference light to interfere with the test light, the reference and test light being derived from a common source, varying an optical path length difference between the test and reference light at the detector, and acquiring an interference signal from the test and reference light while varying the optical path length difference, wherein the interference signal is associated with an imaged area of the object that is larger than a smallest optically-resolvable spot size. The method further includes determining information about the diffractive structure based on the interference signal.

In a further aspect, the invention features systems that include a detector, an interferometer configured to direct test light reflected from an object to the detector to form an image of the object and to direct reference light to interfere with the test light at the detector, the reference and test light being derived from a common source, and the interferometer being further configured to optically resolve features of the object that are larger than a smallest optically-resolvable spot size and to vary an optical path length difference between the test and reference light, and an electronic controller in communication with the detector, wherein during operation the electronic controller acquires an interference signal from the detector while the interferometer varies the optical path length difference, wherein the interference signal is associated with an imaged area of the object that is larger than the smallest optically-resolvable spot size, and determines information about a diffractive structure on the object that is under-resolved in the image based on the interference signal.

In another aspect, the invention features methods that include directing test light reflected from an object along a first path to an image plane to form an image of the object on a multi-element detector positioned at the image plane, where the object includes a diffractive structure that is under-resolved in the image. The method further includes directing reference light along a second path to interfere with the test light at the image plane, the reference and test light being derived from a common source, varying an optical path length difference between the test and reference light, and acquiring an interference signal from a plurality of the detector elements while varying the optical path length difference. The method further includes averaging the interference signals from the plurality of detector elements, thereby creating an averaged interference signal and determining information about the diffractive structure based on the averaged interference signal and predetermined information based on models of light reflected from diffractive structure models.

In a further embodiment, the invention features systems that include an interferometer configured to direct test light reflected from an object along a first path to an image plane to form an image of the object and to direct reference light along a second path to interfere with the test light at the image plane, the reference and test light being derived from a common source, and the interferometer being further configured to vary an optical path length difference between the test and reference light, a multi-element detector positioned at the image plane, and an electronic controller in communication with the multi-element detector, wherein during operation the electronic controller acquires interference signals from a plurality of the detector elements while the interferometer varies the optical path length difference, averages the interference signals from the plurality of detector elements, thereby creating an averaged interference signal, and determines information about a diffractive structure on the object that is under-resolved in the image based on the averaged interference signal and predetermined information based on models of light reflected from diffractive structure models.

In another aspect, the invention features methods that include directing test light reflected from an object along a first path to an image plane to form an image of the object at the image plane, where the object includes a diffractive structure, the test light is specularly and non-specularly reflected from the diffractive structure, and the diffractive structure is under-resolved in the image. The methods include also directing reference light along a second path to interfere with the test light at the image plane, the reference and test light being derived from a common source, monitoring the image while varying an optical path length difference between the test and reference light, and determining information about the diffractive structure based on the monitored image and predetermined information based on models of light that is specularly reflected from diffractive structure model.

In a further aspect, the invention features systems that include an interferometer configured to direct test light reflected from an object along a first path to an image plane to form an image of the object and to direct reference light along a second path to interfere with the test light at the image plane, the reference and test light being derived from a common source, and the interferometer being further configured to vary an optical path length difference between the test and reference light, an image monitoring unit positioned at the image plane, and an electronic controller in communication with the image monitoring unit, wherein during operation the electronic controller acquires interference images from the image monitoring unit while the interferometer varies the optical path length difference, and determines information about a diffractive structure on the object that is under-resolved in the interference images based on the interference images and predetermined information based on models of light reflected from diffractive structure models.

In another aspect, the invention features methods that include comparing information derivable from a scanning interferometry signal for a first surface location of a test object to information corresponding to multiple models of the test object, wherein the object includes an under-resolved diffractive structure, the scanning interferometry signal is based on test light that is specularly and non-specularly reflected from the diffractive structure, the multiple models are based on modeling reflected light that is specularly reflected from diffractive structure model of the test object and that has a reduced contribution from the non-specularly reflected light, and outputting information about the under-resolved diffractive structure based on the comparison.

In a further aspect, the invention features systems that include a computer readable medium having a program that causes a processor in a computer to compare information derivable from a scanning interferometry signal for a first surface location of a test object to information corresponding to multiple models of the test object, wherein the object includes an under-resolved diffractive structure, the scanning interferometry signal is based on test light that is specularly and non-specularly reflected from the diffractive structure, the multiple models are based on modeling reflected light that is specularly reflected from diffractive structure model of the test object and that has a reduced contribution from the non-specularly reflected light, and to output information about the under-resolved diffractive structure based on the comparison.

Implementations of the above-mentioned aspects may include one or more of the following features.

For example, the interference signal can be acquired so that a contribution to the interference signal from the non-specularly reflected light is reduced to be negligible relative to a contribution to the interference signal from the specularly reflected light.

Acquiring the interference signal can include detecting an intensity image with the detector and laterally integrating intensity values of the intensity image over an averaging area of the detector.

The detector can include a plurality of detector elements each of which provides a signal in response to the test and reference light, and acquiring the interference signal can include averaging detected signals of a group of detector elements.

The mathematical model can include essentially only light that is specularly reflected from the model diffractive structure.

Directing test light can include directing non-zero order diffracted light from the diffractive structure. It can further include spatially filtering the test light before forming the image of the object on the detector. Spatially filtering can reduce the contribution to the interference signal from the specularly reflected light. The interferometer can include an optical element to spatially filter the test light before forming the image of the object on the detector.

The test light can be directed to the detector with an optical apparatus, which is configured to optically resolve features of the object that are larger than a smallest optically-resolvable spot size. Then, the interference signal can be associated with a detected area of the object that is larger than the smallest optically-resolvable spot size.

Acquiring the interference signal can include detecting an image, for example, an intensity image, with the detector and laterally integrating (intensity) values of the (intensity) image over an averaging area. The averaging area can be, for example, associated with the imaged area and the imaged area of the object can be larger than the smallest optically-resolvable spot size.

In some embodiment, the detector can include multiple detector elements. Then, acquiring the interference signal can include averaging detected signals of a group of detector elements. For example, the electronic controller can be configured to average detected signals of a group of detector elements or a group of electronically connected detector elements can be configured to provide an averaged detected signal. The group of detector elements can cover an averaging area associated with the imaged area, which can be larger than the smallest optically-resolvable spot size.

Determining information about the diffractive structure can include determining information about an optically unresolved surface feature of the diffractive structure. The information about the optically unresolved surface feature of the diffractive structure can include a height profile, an etch depth, step height, a sidewall angle, a pitch of a grating structure, or a linewidth of a grating structure.

Determining information about the diffractive structure can include comparing the interference signal or information derived from the interference signal with a set of modeled interference signals associated with a set of diffractive structure models or information derived from the set of modeled interference signals associated with the set of diffractive structure models. Examples of derived information include phase information, phase slope, frequency components, or corresponding 2D or 3D data sets.

Determining information about the diffractive structure includes receiving a modeled interference signal or information derived from the modeled interference signal based on modeling essentially specularly reflected light being reflected from a diffractive structure model. For example, one can model only specularly reflected light being reflected from a diffractive structure model and neglect non-specularly reflected light.

The method can use predetermined information that is based on models of light that is specularly reflected from a diffractive structure model selected from the group of models consisting of models for etch depth, models for step height, models for sidewall angle, and models of linewidth of a grating structure.

The method can further include adjusting an operation parameter. Examples of operation parameters include parameters controlling the polarization state of the test light, parameters controlling the wavelength of the test light, parameters controlling the incident angle of the test light on the test sample, parameters controlling the position of the detector, and parameters controlling the extend of laterally averaging.

The method can further include illuminating multiple locations of the object and acquiring multiple interference signals associated with the multiple locations, and determining geometric information about the diffractive structure on the object.

The detector can be configured to detect an image and wherein the electronic controller can be configured to laterally integrate values of the image over an averaging area to acquire the interference signal.

The detector can include detector elements and wherein the electronic controller can be configured to average detected signals of a group of detector elements to acquire the interference signal.

The detector can include a plurality of detector elements and wherein a group of electronically connected detector elements can be configured to provide an averaged detected signal.

The interferometer can include an optical element to spatially filter the test light before forming the image of the object on the detector.

The interferometer can be configured to optically resolve features of the object that are larger than a smallest optically-resolvable spot size.

The interference signal can be associated with an imaged area of the object at the detector that is larger than the smallest optically-resolvable spot size.

The interferometer and the detector can be configured to direct and detect multiple interference signals associated with multiple locations on the object.

The interferometer can be configured to optically resolve features of the object that are larger than a smallest optically-resolvable spot size. Then, the interference signal can be associated with an imaged area of the object that is larger than the smallest optically-resolvable spot size.

The electronic controller can be configured to compare the interference signal or information derived from the interference signal with a set of modeled interference signals associated with a set of diffractive structure models or information derived from the modeled interference signals associated with the set of diffractive structure models.

The electronic controller can be configured to receive a modeled interference signal based on modeling essentially specularly reflected light being reflected from the diffractive structure model. For example, the electronic controller can be configured to receive a modeled interference signal based on modeling only specularly reflected light being reflected from the diffractive structure model.

Alternatively, or in addition, the electronic controller can be configured to determine a modeled interference signal.

Modeled interference signals can be determined for specific operation parameters. Examples for operation parameters include parameters controlling the polarization state of the test light, parameters controlling the wavelength of the test light, parameters controlling the incident angle of the test light on the test sample, parameters controlling the position of the detector, and parameters controlling the extend of laterally averaging The interferometer and the detector can be configured to direct and detect multiple interference signals associated with multiple locations on the object.

These general and specific aspects may be implemented using a system, a method, a computer readable medium, or a computer program, or any combination of systems, methods, a computer readable medium, or a computer programs.

Implementations may have one or more of the following advantages. Imaging interferometers are inherently non-contact, have high throughput, and in many cases have greater metrology capability than alternative techniques. Embodiments can be used in integrated circuit manufacturing as an optical tool for process control, defect detection, surface monitoring, and critical dimensions (CD) measurement of structures that cannot be directly resolved in a conventional microscope is The details of one or more embodiments are set forth in the accompanying drawings and the description below. Other features and advantages will be apparent from the description, drawings, and claims.

DESCRIPTION OF DRAWINGS

Like reference symbols in the various drawings indicate like elements.

DETAILED DESCRIPTION

The analysis of an under-resolved object surface structure can be based on measured and modeled interference signals which neglect or use a reduced contribution of non-specular reflected light. The measured interference signal is acquired with an interferometry system, such as interferometry system 100 shown in FIG. 1. Interferometry system 100 is based on a Michelson interferometer with an adjustable optical path length in the reference leg.

Figure 1:
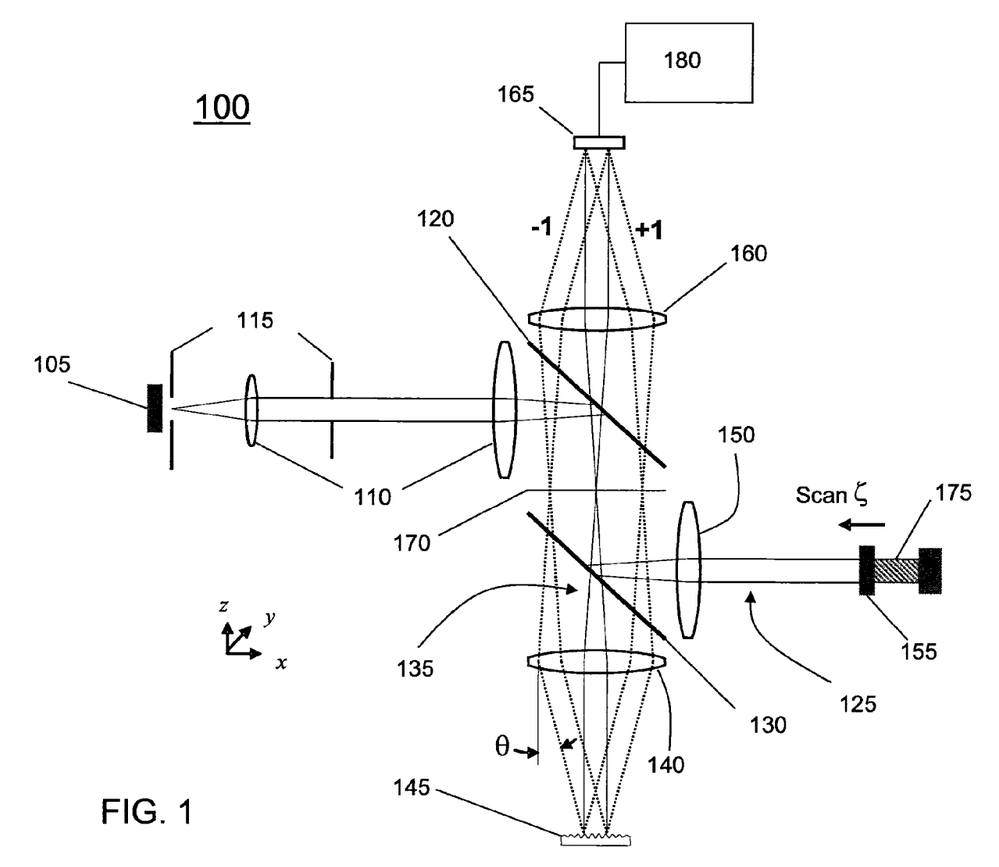
FIG. 1 is a schematic drawing of a Michelson interferometer.

In interferometry system 100, light from a source 105 is collimated with lenses 110 and apertures 115. Using an illumination beamsplitter 120, the collimated light is then coupled into an interferometer unit with an imaging optical path and a reference optical path, which partly overlap. The interferometer unit includes an interferometer beamsplitter 130 which separates light from illumination beamsplitter 120 into reference light and measurement light. Reference light 125, which is reflected from interferometer beamsplitter 130, reflects from a reference object 155 (e.g., a mirror) back towards interferometer beamsplitter 130. Reference object 155 is mounted on a scanning stage 175 which is configured to vary the optical path length of reference light 125.

Measurement light 135 is transmitted by interferometric beam splitter 130 and reflects from a test sample 145 positioned on a sample stage (not shown). For a microscope-based interferometry system, the size of typical test samples is in the range from about 1 µm to several 100 µm, for example, about 10 µm. An example of a test sample is a grating target for the purpose of process control in lithography and other fine-scale manufacturing methods. Test light reflected from test sample 145 returns to beamsplitter 130 where it recombines with reflected reference light to form the interferometer's output beam.

The interferometer also includes a measurement objective lens 140 positioned in the path of measurement light 135 and a corresponding reference objective lens 150 positioned in the path of reference light 125. Measurement objective lens 140 and reference objective lens 150 can have common optical properties (e.g., matched numerical apertures). Although measurement objective lens 140 and reference objective lens 150 are depicted as single lens elements, in embodiments, these lenses can be compound lenses.

An imaging lens 160 is positioned in the path of the output beam and images the test sample 145 onto a detector 165, which is in communication with an electronic processor 180 (e.g., a computer). Detector 165 includes multiple detector elements, e.g., it can be a pixilated detector such as a pixilated camera.

Similarly, imaging lens 160 images reference object 155 (e.g., a reference mirror) onto the detector 165. Accordingly, detector 165 detects an intensity pattern that results from the measurement and reference light interfering at detector 165.

During operation, scanning stage 175 coupled to reference object 155 scans the position of test sample 145 relative to reference object 155 as denoted by a scan coordinate $\zeta$. Scanning stage 175 can be based, for example, on a piezoelectric transducer. By varying the position of reference object 155, scanner 175 varies the optical path length difference (OPD) between the test and measurement light at detector 165, thereby varying the detected intensity pattern. Typically, detector 165 acquires a series of intensity measurements at each detector element so that each detector element provides a corresponding interference signal which can be analyzed by electronic processor 180.

While interferometry system 100 operates by scanning reference object 155, the scanning of the OPD can be achieved by scanning test sample 145 relative to interferometer beamsplitter 130.

In addition to acquiring interference signals from detector 165, electronic controller 180 may also control one or more components of interferometry system 100, such as light source 105, scanner stage 175, and/or detector 165.

In general, light is reflected specularly and non-specularly from the test sample 145. Non-specularly reflected light refers, for example, to non-zero order diffraction from structure on the surface of test sample 145. FIG. 1 shows the path of light through interferometry system 100 by two chief rays. In addition to the chief rays, which are normally incident on and reflected from test sample 145 and reference object 155, light that is non-specularly reflected from sample 145 is also shown, labeled as +1 and −1. Also shown in FIG. 1 is a pupil plane 170, which corresponds to the location where the chief rays cross the optical axis of the interferometry system.

Interferometry system 100 can be used to gain information about under-resolved surface structures, e.g., under-resolved grating patterns or under-resolved step heights. Under-resolved surface structures are smaller than the smallest optically resolved feature size, and hence are not resolved in images acquired by interferometry system 100. Examples of under-resolved features can include gratings with a pitch smaller than the nominal source wavelength of the illuminating light. To analyze the sample surface structure and under-resolved surface features, one measures an interference signal and compares that measured interference signal with modeled interference signals associated with, e.g., a diffractive structure model. Because the reflected light contains specular and non-specular components from the under-resolved features, determining an interference signal from a model structure can be complex.

However, where the interference signal is acquired using a detector of sufficiently large area, it is believed that the contribution to the interference signal by light that is non-specularly reflected from the test object is negligible. Accordingly, in such implementations, one can simplify the analysis by modeling only specularly reflected light from a model structure.

The effective area of the detector can be increased from its native area of a detector element by, for example, laterally averaging the interference signals from multiple detector elements.

Lateral averaging can be achieved, for example, by integrating the intensity image across several adjacent detector elements so that intensity data are averaged over a large area in comparison with an imaged area associated with the smallest resolvable spot as defined by the imaging optics. Alternatively, or additionally, lateral averaging can be achieved by averaging the measured interference signals from a plurality of detector elements electronically or in software so that image integration over an area is achieved, where the area is large in comparison with the imaged area associated with the smallest resolvable spot as defined by the imaging optics. As a further example, lateral averaging can be achieved by spatial filtering or mixing the test light, e.g., by use of appropriate optical elements, so that the detector is only sensitive to incident light that has been laterally averaged over an area that is larger than the imaged area associated with the smallest optically-resolved feature size.

The lateral averaging of the intensity image at the detector has the effect of suppressing the contribution of non-specularly reflected light from the under-resolved surface structure to the interference signal. Suppression of non-specularly reflected light simplifies the analysis of optically-unresolved surface features because less complex modeling techniques can be used to determine the modeled interference signal, for example, when setting up a library of modeled signals.

The effect of lateral averaging can be understood by considering a simplified interferometry system equipped with a large-area, single element detector at the image plane and the light source has only one source point. The test sample is assumed to be a shallow grating-like object. In addition to the specular reflection field $E_0$, two principle diffracted orders $E_{+1}$, $E_{-1}$, both of amplitude $|E_{\pm 1}|$, are imaged onto the detector. The reference path will contribute an electric field $E_R(\zeta)$, which depends on the scan coordinate $\zeta$. To further simplify, the magnification of the imaging optics is set to one, and the particular source point chosen for consideration is such that the illumination is exactly on axis, i.e. perpendicular to the surface of the test object. From FIG. 1, the specular reflection field $E_0$ is aligned with the reference electric field $E_R(\zeta)$, whereas the diffracted orders $E_{+1}$ and $E_{-1}$ come in at an angle $\theta$ with respect to the reference electric field $E_R(\zeta)$. Thus, the diffracted orders $E_{+1}$ and $E_{-1}$ are both functions of the lateral coordinate x; whereas the other fields are uniform over the detector. Finally, only one wavelength, $\lambda$, with corresponding angular wave number, $k=2\pi/\lambda$ is considered.

One is interested in the interference signal that is generated while scanning the reference mirror. The intensity $g(\zeta,x)$ at a specific point in the image is given by:

$$g(\zeta,x)=|E_0+E_{+1}(x)+E_{-1}(X)+E_R(\zeta)|^2, \quad (1)$$

which can be expanded to:

$$g(\zeta,x)=DC+2|E_R||E_0|\cos(2k\zeta)+4|E_R||E_{\pm1}|\cos(fx+2k\zeta). \quad (2)$$

The first term DC does not modulate with the scan coordinate $\zeta$ and is given by $$DC=|E_0|^2+|E_R|^2+2|E_{\pm1}|^2+4|E_0||E_{\pm1}|\cos(fx)+2|E_{\pm1}|^2\cos(2fx). \quad (3)$$

The oscillation of the remaining part depends on the lateral frequency $$f=k\sin(\theta) \quad (4)$$

of the grating and the scan coordinate $\zeta$. Thus, the image contains some terms that will modulate at a rate $2k\zeta$ while scanning over the range of the OPD.

The specular contribution to the modulating signal is, from Eq. (2), $$\text{specular}(\zeta,x)=2|E_R||E_0|\cos(2k\zeta), \quad (5)$$

while the non-specular modulating signal is $$\text{non-specular}(\zeta,x)=4|E_R||E_{\pm1}|\cos(fx+2k\zeta). \quad (6)$$

To account for the size of a "large" detector, one integrates the intensity $g(\zeta, x)$ over a detector width D of the detector, which yields the intensity $I(\zeta)$ of the reflected light on the detector:

$$I(\zeta) = \frac{1}{D}\int_{-D/2}^{D/2} g(\zeta,x)\,dx. \quad (7)$$

The specular modulation, which does not depending on the position x, does not change:

$$\text{specular}(\zeta)=2|E_R||E_0|\cos(2k\zeta). \quad (8)$$

However, for the non-specular term, the integration over x yields $$\text{non-specular}(\zeta)=V(D)4|E_R||E_{\pm1}|\cos(2k\zeta), \quad (9)$$

where a signal strength V(D) for a detector with width D compared to a point detector is introduced. The signal strength V(D) follows a sinc-function $$V(D) = \frac{\sin(fD/2)}{fD/2}. \quad (10)$$

Relating the lateral frequency f for a grating-like object to a period p and using the grating equation:

$$\sin(\theta)=\lambda/p, \quad (11)$$

the lateral frequency is given by:

$$f=2\pi/p. \quad (12)$$

Thus, the signal strength V(D) can be written as a function of the ratio D/p:

$$V(D) = \frac{\sin(\pi D/p)}{\pi D/p}. \quad (13)$$

Figure 2:
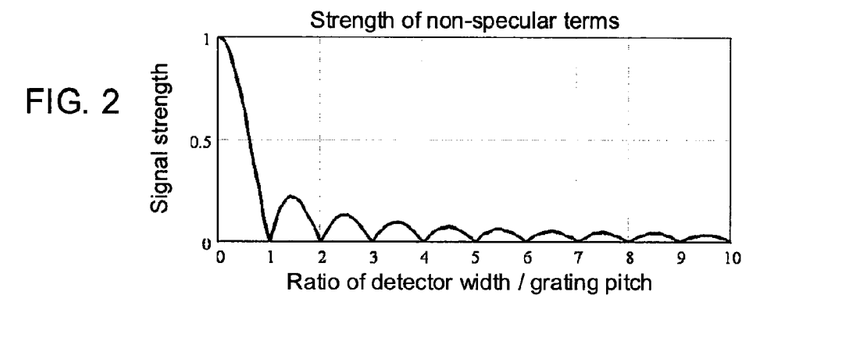
FIG. 2 is a plot of a signal strength factor that controls non-specular terms in the reflection of light from a grating structure.

FIG. 2 shows a plot of the signal strength of the non-specular term, i.e., the magnitude of the signal strength |V(D)|, over the ratio detector width over grating pitch D/p. With increasing ratio D/p, e.g. for grating structures and detector sizes having a ratio D/p>10), the non-specular term goes rapidly to zero. Thus, when increasing the detected area, one simply averages the grating image laterally over what would typically be many (e.g., 8 or more, 10 or more, 12 or more, 15 or more, 20 or more) periods within a test structure.

Extending to multiple source points of an extended source, the various source points populate the pupil plane and provide a full range of incident angles to the test sample surface. However, these multiple source points are mutually incoherent and it is believed that the same conclusion applies to the complete system. The non-specular terms for each source point will be attenuated by the lateral image averaging across a sufficiently large detector area. The final signal is an incoherent superposition of the signals for each source point.

As discussed previously, laterally averaged interference signals can be generated through the detection process and/or using appropriate components in the imaging path of the light.

Figure 3:
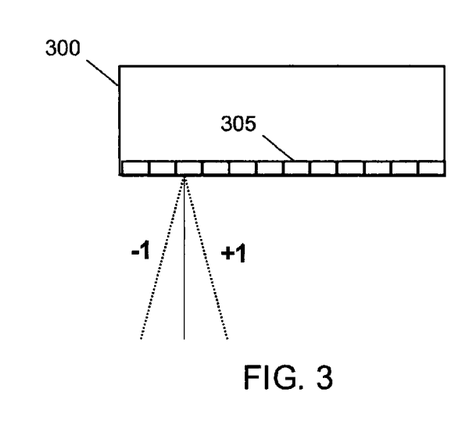
FIG. 3 is a view of a cross section of an embodiment of a detector.
Figure 4:
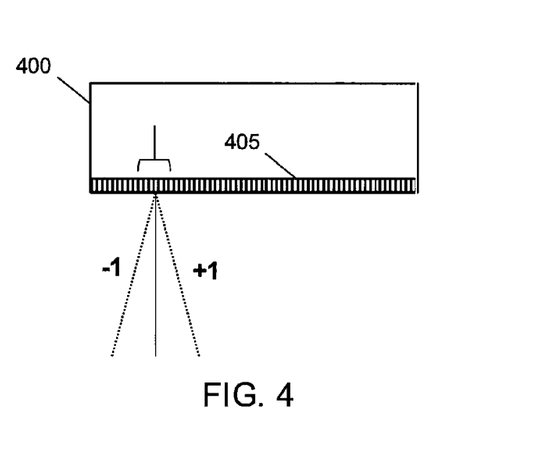
FIG. 4 is a view of a cross section of an embodiment of a detector.

In the detection process, one can generate a laterally averaged interference signal as illustrated in FIG. 3 by using a detector 300 with a detecting area of a detector element 305 that is large enough so that a contribution to the interference signal from the non-specularly reflected light (labeled as +1 and −1) is reduced or negligible relative to a contribution to the interference signal from the specularly reflected light. Referring to FIG. 4, alternatively, or additionally, one can combine electronically multiple detector elements 405 of a detector 400 to yield an interference signal corresponding to a sufficiently large detecting area. In some embodiments, interference signals from multiple detector elements can be combined by the algorithm executing the analysis.

When detecting two-dimensional (2D) interference images, one can average data points of each of the 2D interference images over an averaging area. The averaging process in 2D can be executed as a running average, which corresponds to overlapping image areas, or one can generate interference signals that correspond to non-overlapping areas thereby reducing the resolution of the 2D interference image.

Figure 5:
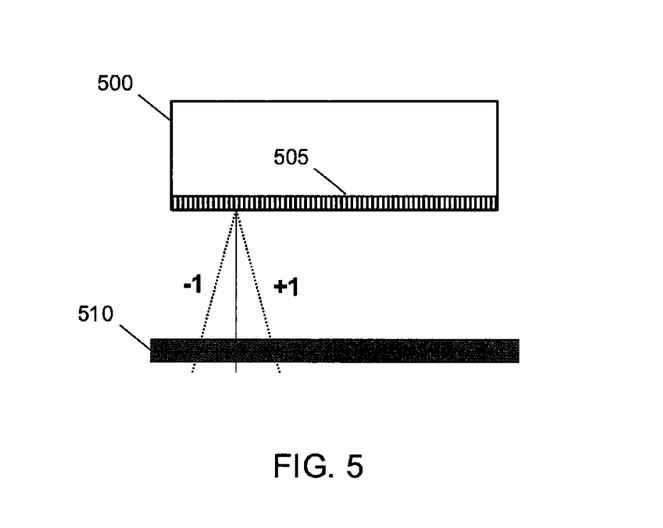
FIG. 5 is a view of a cross section of an embodiment of a detector and an optical diffusing medium.

Referring to FIG. 5, alternatively, or additionally, one can provide appropriate optical elements in the optical system such that a detector element 505 of a detector 500 is sensitive to test light originating from an area that is sufficiently large to reduce the contribution of the non-specularly reflected light in the detected interference signal. As an example, one may diffuse the reflected light shortly before the detector with an optical diffusing medium 510. Alternatively, or additionally, one may move the detector out of the image plane and/or use a small aperture stop (e.g., a pinhole) in pupil plane 170. The aperture stop substantially reduces the NA of the optical system, thereby decreasing the resolution of the imaging optics.

Turning now to the analysis of detected interference signals, information about under-resolved surface features is also present within an interference signal that is measured with a reduced sensitivity to non-specularly reflected and with a preferential sensitivity to specularly-reflected light. The analysis of the measured signal can be based on appropriate models of the reflection of light from sample structure models.

Figure 6:
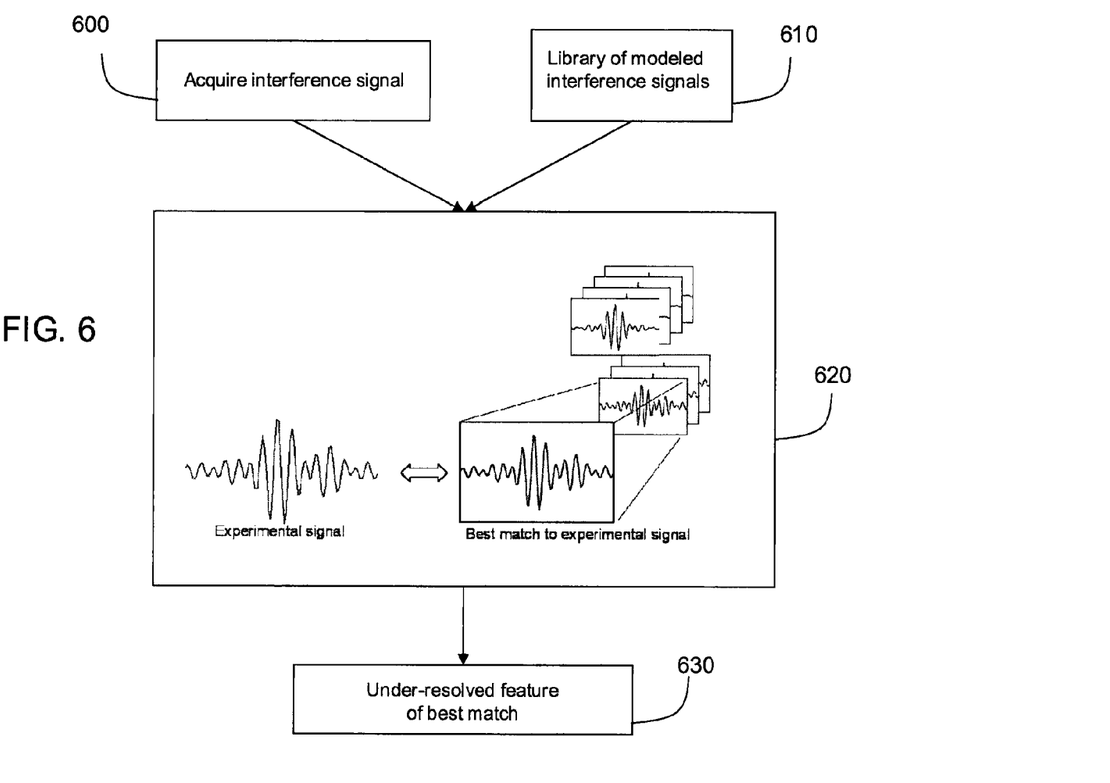
FIG. 6 is a flowchart illustrating under-resolved interferometric profiling.

FIG. 6 shows a flow chart outlining a method of analyzing a test sample for under-resolved surface structure. One first acquires a measured interference signal having none or at least a reduced contribution of non-specularly reflected light (step 600). For several diffractive structure models, one also generates a library of modeled interference signals (step 610). These modeled interference signals also have none or at least a reduced contribution of non-specularly reflected light (e.g., they are based on models of light that is specularly reflected from diffractive structure models). Then, one compares the measured interference signal with the modeled interference signals from the library to find the best match (step 620), e.g., by a least squares fitting algorithm. Finally, one selects the best matching diffractive structure model to represent the unknown under-resolved surface structure (step 630).

During data acquisition (step 600), electronic controller 180 records an interference intensity signal during an OPD scan for each of the detector elements, where the interference intensity signal correspond to different surface locations of the object surface. The recorded interference intensity signal may already fulfill the requirement of a reduced contribution of non-specularly reflected light and/or electronic controller 180 may use hardware or software to generate such "laterally averaged signals." The laterally averaged interference intensity signals are then, for example, stored as a function of the OPD scan position for each detector element.

Referring specifically to the library comparison of step 620, the analysis of the scanning interferometry data may be performed in a variety of ways. In some embodiments, the analysis is performed in the spatial frequency domain (referred to as frequency domain analysis (FDA)), which is described in more detail below. Alternatively, or additionally, one can perform the analysis can be performed in the scan coordinate domain (referred to as scan domain analysis (SDA)), which is described subsequently to FDA.

For FDA, the computer typically performs a transform (e.g., a Fourier transform) for each of the laterally averaged interference intensity signals to generate a frequency-domain spectrum. The spectrum contains both magnitude and phase information as a function of the spatial frequency of the signals in the scanning dimension. For example, a suitable frequency domain analysis for generating such a spectrum is disclosed in commonly owned U.S. Pat. No. 5,398,113 by Peter de Groot and entitled "Method and Apparatus for Surface Topography Measurements by Spatial-Frequency Analysis of Interferograms," the contents of which are incorporated herein by reference.

Typically, the library that is generated is related to the nature of analysis performed on the data. For example, in embodiments that utilize FDA, during library generation (step 610), a computer generates a library of theoretical predictions (candidate solutions) for frequency-domain spectra for a variety of surface parameters and a model for the interferometer, which is also based on a reduced (e.g., zero) contribution of non-specularly reflected light. These spectra may for example cover a range of surface materials and surface textures.

In certain embodiments, library generation (step 610) is done empirically, using sample artifacts and detecting mainly specularly reflected light. In some embodiments, the library may use information from prior supplemental measurements of the object surface provided by other instruments, for example an ellipsometer, and any other input from a user regarding known properties of the object surface, so as to reduce the number of unknown surface parameters. In general, theoretical modeling, empirical data, or theory augmented by supplemental measurements may be expanded by interpolation to generate intermediate values, either as part of the library generation or in real time during the succeeding library search (step 620).

Within the library search (step 620), the experimental data is compared to the prediction library by means of a search within the library. Typically, a best-fit library solution yields corresponding surface structure parameters. In the example case of a grating on a substrate, the library for a single surface type, e.g., a grating on a Si-substrate, ranges over many possible grating pitches. Another example case would be surface roughness, for which the adjustable parameter may be roughness depth and/or spatial frequency. Other parameters for gratings include duty cycle, side wall angle, grating shape (e.g., rectangular, sawtooth, trapezoidal, or sinusoidal), and grating geometry (2D- and 3D-line shape, linear or non-linear line repetition). Examples of other surface structures include repetitive or non-repetitive 2D or 3D surface structures or scattering surface layers that result in non-specularly reflected light.

In comparing the theoretical and experimental data in FDA, for example, the library search may be based on one or more of the following:

a product of, or a difference between, magnitude and/or phase data in the frequency spectrum, including, e.g., the product of, or difference between, the average magnitude and the average phase;

the average magnitude itself, and the average phase itself;
the slope, width and/or height of the magnitude spectrum;
interference contrast;
data in the frequency spectrum at DC or zero spatial frequency;
nonlinearity or shape of the magnitude spectrum;
the zero-frequency intercept of the phase; and
nonlinearity or shape of the phase spectrum.

Note that as used herein magnitude and amplitude are used interchangeably.

Moreover, the data acquisition (step 600) and the library search (step 620) can also include a system characterization, which includes, e.g., measuring one or more reference artifacts having a known surface structure and surface topography, so as to determine parameters such as system wavefront error, dispersion, and efficiency that may not be included in the theoretical model.

Furthermore, an overall calibration can be included, which includes, e.g., measuring one or more reference artifacts to determine the correlation between measured surface parameters, such as grating pitch as determined by the library search, and the values for these parameters as determined independently, e.g., by ellipsometric analysis.

As a result of the library search (step 620), a best match is selected (step 630). Performed, for example, in electronic controller 180, the selection process is based on characteristics, which are essentially independent of the surface height, and ensures that the best match matches the characteristics of the measured frequency spectrum. An example characteristic is, for example, the average value of the magnitude spectrum, which is related to the overall reflectivity of the surface, or the variation in magnitude as a function of spatial frequency, which in a monochromatic high-numerical aperture system relates to the scattering angle of the reflected light.

The best match can then be displayed or numerically or graphically transmitted by electronic controller 180 to the user or to a host system for further analysis or for data storage.

Using the surface parameter results, electronic controller 180 may then determine surface height information, for example, in addition to characteristics identified by the library search.

To present the result, electronic controller 180 can generate a compensated phase spectrum, for example, by subtracting the corresponding theoretical phase spectrum directly from the experimental phase spectrum. Electronic controller 180 then can determine the local surface height for one or more surface points by analysis of the compensated phase as a function of spatial frequency, for example, by analysis of the coefficients generated by a linear fit. Thereafter, electronic controller 180 generates a complete three-dimensional image constructed from the height data and corresponding image plane coordinates, together with graphical or numerical display of the surface characteristics as determined by the library search.

In some embodiments, the user may only be interested in the surface characteristics modeled by the prediction library, but not in surface height, in which case the steps for determining surface height are not performed. Conversely, for some areas the user may only be interested in surface height, but not in the surface characteristics of the best match, in which case electronic controller 180 uses the comparison between the experimental data and the prediction library to compensate the experimental data for the contributions of the surface characteristics, so that the surface height is more accurately determined, but electronic controller 180 needs not explicitly determine the surface characteristics or display them.

In extension to the described two step process, the data acquisition (step 600), the library generation (step 610) and/or the library search (step 610) can be performed iteratively to further improve the results. As an example, one can generate refined libraries during one iteration step that are relevant to the local surface type and the succeeding library search is then refined on a pixel-by-pixel or regional basis. For example, if it is found that the surface has a grating pitch of approximately 10 nm during a preliminary library search, then the computer may generate a fine-grain library of example values close to 10 nm, which refine the search.

Alternatively or in addition to FDA, the analysis can include SDA, i.e., be based on information in the scan coordinate domain. An analysis in the scan coordinate domain is in principal similar to analysis in the frequency domain, except that the comparison between the experimental data and the prediction library (step 620) is based on information in the scan coordinate domain. In the scan domain, the experimental signal usually is characterized by a quasi-periodic carrier oscillation modulated in amplitude by an envelope function with respect to the scan coordinate.

In comparing the theoretical and experimental data (step 620), a library search within SDA may be based on one or more of the following:

average signal strength; the shape of the signal envelope, including, e.g., deviation from some ideal or reference shape such as a Gaussian;

the phase of the carrier signal with respect to the envelope function;

the relative spacing of zero crossings and/or signal maxima and minima;

values for maxima and minima and their ordering; and peak value of the correlation between the library and measured signals, after adjusting for optimal relative scan position.

Moreover, many features described for FDA may be used in SDA as they are or in form of a SDA analog, e.g., calibration and iteration To provide all the information required for the specific analysis, the interferometry system may include one or more of the following features:

a spectrally narrow-band light source with a high numerical aperture (NA) objective;

a spectrally broad band light source;

a combination of a high-NA objective and a spectrally broadband source;

an interferometric microscope objectives, including oil/water immersion and solid immersion types, in, e.g., Michelson, Mirau or Linnik geometries;

a sequence of measurements at multiple wavelengths;

unpolarized light;

polarized light, including linear, circular, or structured; and features for an overall system calibration.

For example, structured polarized light may involve a polarization mask, generating different polarizations for different segments of the illumination or imaging pupils, so as to reveal polarization-dependent optical effects attributable to surface characteristics.

A number of embodiments have been described. Nevertheless, it will be understood that various modifications may be made. For example, one may analyze the test sample surface at a specific azimuthal angle. Angular analysis can be achieved by properly-structured illumination or a specific designed imaging system. It can be achieved further by masking, beam shaping, and/or electro-optical spatial modulation, e.g., in the pupil plane.

Moreover, one can use apertures, polarizers, wavelength filters or other devices at or near the pupil plane 170 of the imaging apparatus so as to isolate various azimuthal angles, positions within the pupil plane, polarizations etc., either statically or dynamically.

Some interferometer configurations can allow acquiring interference signals over many different angles, to narrow the range of candidate solutions to the inverse problem and therefore improve its accuracy. Referring again to FIG. 1, for example, when the test sample 145 is illuminated at many angles simultaneously, it is possible that the inverse problem may in fact become more complicated. This is because the surface structures may diffract light at angles different from the angle of incidence into the capture range of the detector 165. Thus, at a specific reflection angle, test sample 145 may be illuminated with light from multiple incident angles, in a manner that does not allow the instrument to distinguish between the various sources of scattered light. For this reason, it is common to illuminate the test sample 145 at only one angle of incidence at a time, and often, to measure only one reflected angle at a time, usually the specular reflection for which the angle of incidence equals the angle of reflection, as shown in FIG. 1.

Some configurations may allow an extraction of angle-dependent data using techniques as described in U.S. Pat. No. 7,139,081 by Peter de Groot entitled "Interferometry Method for Ellipsometry, Reflectometry, and Scatterometry Measurements, Including Characterization of Thin Film Structures."

For example, to analyze the sample surface with various polarization states, one can use polarizing elements, e.g., in the illumination or imaging planes. These elements may be electro-optically actuated and operate at high speed, again providing hundreds of measurements per second because of the high-speed data acquisition afforded by the single-detector geometry.

Alternatively, or in addition, one can apply or select multiple wavelengths by using a filtered light source and multiple data acquisitions. The filtering of wavelengths may be performed by spectroscopic means, tunable-wavelength interference filters, a second interferometer, an acousto-optic tunable filter, switchable light sources such as multiple lasers operated in sequence, or any other device or combination of devices.

Some configurations allow for high-speed data acquisition, which can be made possible by a single or small number of detector elements near the image plane, allowing for rapid, repetitive measurements as needed to accommodate averaging or sequential changes in the instrument configuration, e.g., sequencing through a range of wavelengths. If one uses only a single detector, the data acquisition can be extremely fast, e.g. less than 1 msec. Accordingly, structured illumination or imaging can be highly dynamically adapted to new angles, allowing, e.g., for hundreds of azimuthal angles to be interrogated every second.

Moreover, if the detector uses several detector elements (e.g., about 100 or more), then it is feasible to determine the relative strengths of the specular and non-specular light images by changing the amount of lateral averaging at the detector. The greater the detector area is set, the less is the effect of the non-specular light. Then, one can estimate, for example, the decay of the signal strength |V(D)| and deduce the grating pitch associated with that behavior using Eq. (13).

Using FDA and/or SDA, the techniques described above may be applied to a variety of surface analysis problems, including, for example:

sharp edges and surface features that diffract or otherwise generate complex interference effects;

under-resolved surface roughness;

under-resolved surface features, for example, one or more sub-wavelength width grooves on an otherwise smooth surface;

simple thin films (in which case, for example, the variable parameter of interest may be the film thickness, the refractive index of the film, the refractive index of the substrate, or some combination thereof;

multilayer thin films;

dissimilar materials (for example, the surface may comprise a combination of thin film and a solid metal, in which case the library may include both surface structure types and automatically identify the film or the solid metal by a match to the corresponding frequency-domain spectra);

optical activity such as fluorescence;

spectroscopic properties of the surface, such as color and wavelength-dependent reflectivity;

polarization-dependent properties of the surface;

deflections, vibrations or motions of the surface or deformable surface features that result in perturbations of the interference signal; and data distortions related to the data acquisition procedure, e.g., a data acquisition window that does not fully encompass the interference intensity data.

Among other applications, the techniques described above can be applied to process control in semiconductor manufacturing. An example of this is in-process monitoring of critical dimensions (CDs), which is central to the fabrication of many high-technology components on the micron and nanometer scales. Examples include semiconductor IC processes such as transistor and logic creation, as well as copper-damascened connections. Defined broadly, CDs include lateral dimensions, etch depth, film thickness, step height, sidewall angle and related physical dimensions that influence the performance of semiconductor devices. CD metrology provides process control and defect detection that occur in the course of manufacturing, especially as a result of processes such as etching, polishing, cleaning and patterning. In addition, the basic measurement capabilities implied by CD metrology have broad application outside of Semiconductor IC manufacturing, including, e.g., displays (e.g., liquid crystal displays), nanostructures, and diffractive optics.

It is to be further understood that, because some of the constituent system components and method steps depicted in the accompanying figures can be implemented in software, the actual connections between the systems components (or the process steps) may differ depending upon the manner in which the disclosed method is programmed. Given the teachings provided herein, one of ordinary skill in the related art will be able to contemplate these and similar implementations or configurations of the disclosed systems and methods.

For example, the numerical and symbolic steps described herein can be converted into a digital program executed, e.g., on a digital signal processor according to methods well known in the art. The digital program can be stored on a computer readable medium such as a hard disk and can be executable by a computer processor. Alternatively, the appropriate steps can be converted into a digital program that is hardwired into dedicated electronic circuits within the processor that executes the steps. Methods for generating such dedicated electronic circuits based on a given numerical or symbolic analysis procedure are also well known in the art.

Accordingly, other embodiments are within the scope of the following claims.

What is claimed is:

1. A method, comprising:
    directing test light reflected from an object to form an image of the object on a detector, where the object includes a diffractive structure, the test light at the detector comprises both specularly and non-specularly reflected light from the diffractive structure, and the diffractive structure is under-resolved in the image;
    directing reference light to interfere with the test light at the detector, the reference and test light being derived from a common source;
    varying an optical path length difference between the test and reference light;
    acquiring an interference signal from the detector while varying the optical path length difference so that a contribution to the interference signal from the non-specularly reflected light is reduced to be negligible relative to a contribution to the interference signal from the specularly reflected light,
    wherein acquiring the interference signal includes detecting an intensity image with the detector and laterally integrating intensity values of the intensity image over an averaging area of the detector; and
    determining information about the diffractive structure based on the interference signal and on predetermined information derived from a mathematical model of light reflection from a model diffractive structure.

2. The method of claim 1, wherein the detector includes a plurality of detector elements each of which provides a signal in response to the test and reference light, and acquiring the interference signal includes averaging detected signals of a group of detector elements.

3. The method of claim 1, wherein the mathematical model includes essentially only light that is specularly reflected from the model diffractive structure.

4. The method of claim 1, wherein directing test light includes spatially filtering the test light before forming the image of the object on the detector.

5. The method of claim 4, wherein spatially filtering reduces the contribution to the interference signal from the specularly reflected light.

6. The method of claim 1, wherein the test light is directed to the detector with an optical apparatus, which is configured to optically resolve features of the object that are larger than a smallest optically-resolvable spot size.

7. The method of claim 6, wherein the interference signal is associated with a detected area of the object that is larger than the smallest optically-resolvable spot size.

8. The method of claim 1, wherein determining information about the diffractive structure includes determining information about an optically unresolved surface feature of the diffractive structure.

9. The method of claim 8, wherein the information about the optically unresolved surface feature of the diffractive structure includes a height profile, an etch depth, step height, a sidewall angle, a pitch of a grating structure, or a linewidth of a grating structure.

10. The method of claim 1, wherein determining information about the diffractive structure includes comparing the interference signal or information derived from the interference signal with a set of modeled interference signals or information derived from modeled interference signals, where each modeled interference signal is associated with a corresponding model diffractive structure.

11. A system, comprising:
a detector, wherein the detector is configured to detect an image;
an interferometer configured to direct test light reflected from an object having a diffractive structure to the detector to form an image of the object where test light at the detector includes light that is both specularly and non-specularly reflected from the diffractive structure and the diffractive structure is under-resolved in the image, the interferometer being configured to direct reference light to interfere with the test light at the detector, the reference and test light being derived from a common source, and the interferometer being further configured to vary an optical path length difference between the test and reference light; and
an electronic controller in communication with the detector, wherein during operation the electronic controller acquires an interference signal from the detector while the interferometer varies the optical path length difference, wherein the electronic controller comprises predetermined information derived from a mathematical model of light reflection from a model diffractive structure and during operation the electronic controller determines information about the diffractive structure based on the interference signal and the predetermined information,
wherein the electronic controller is configured to laterally integrate values of the image over an averaging area to acquire the interference signal.

12. The system of claim 11, wherein the detector includes detector elements and wherein the electronic controller is configured to average detected signals of a group of detector elements to acquire the interference signal.

13. The system of claim 11, wherein the detector includes a plurality of detector elements and wherein a group of electronically connected detector elements are configured to provide an averaged detected signal.

14. The system of claim 11, wherein the interferometer includes an optical element to spatially filter the test light before forming the image of the object on the detector.

15. The system of claim 11, wherein the interferometer is configured to optically resolve features of the object that are larger than a smallest optically-resolvable spot size.

16. The system of claim 15, wherein the interference signal is associated with an imaged area of the object at the detector that is larger than the smallest optically-resolvable spot size.

17. The system of claim 11, wherein the interferometer and the detector are configured to direct and detect multiple interference signals associated with multiple locations on the object.

18. A method, comprising:
directing test light reflected from an object along a first path to an image plane to form an image of the object on a multi-element detector positioned at the image plane, where the object includes a diffractive structure that is under-resolved in the image, and wherein the image includes contributions from both specularly and non-specularly reflect light from the diffractive structure;
directing reference light along a second path to interfere with the test light at the image plane, the reference and test light being derived from a common source;
varying an optical path length difference between the test and reference light;
acquiring an interference signal from a plurality of the detector elements while varying the optical path length difference;
averaging the interference signals from the plurality of detector elements, thereby creating an averaged interference signal, wherein averaging the interference signals includes laterally integrating intensity values of the interference signals over an averaging area of the detector so that the contributions from the non-specularly reflected light are reduced to be negligible relative to the contributions from the specularly reflected light; and
determining information about the diffractive structure based on the averaged interference signal and predetermined information derived from a mathematical model of light reflection from a model diffractive structure.

19. A method, comprising:
directing test light reflected from an object to form an image of the object on a detector, where the object includes a diffractive structure, the test light at the detector comprises both specularly and non-specularly reflected light from the diffractive structure, and the diffractive structure is under-resolved in the image;
directing reference light to interfere with the test light at the image plane, the reference and test light being derived from a common source;
monitoring the image while varying an optical path length difference between the test and reference light; and
determining information about the diffractive structure based on the monitored image and on predetermined information derived from a mathematical model of light reflection from a model diffractive structure, wherein determining information about the diffractive structure includes laterally integrating interference signals from the detector over an averaging area of the detector so that a contribution of the non-specularly reflected light is reduced to be negligible relative to a contribution from the specularly reflected light.

20. A method comprising:
obtaining a scanning interferometry signal for a first surface location of a test object, the scanning interferometry signal being generated by a scanning interferometer, wherein the test object includes an under-resolved diffractive structure and the scanning interferometry signal is based on test light that is specularly and non-specularly reflected from the diffractive structure;
comparing information from the scanning interferometry signal to information derived from a mathematical model of light reflected from a model test object, wherein the information from the scanning interferometry signal includes a reduced contribution of non-specularly reflected light relative to a contribution of specularly reflected light based on a lateral integration of image intensity values over an image averaging area, and wherein the mathematical model includes modeling only light that is specularly reflected from a diffractive structure of the model test object; and outputting information about the under-resolved diffractive structure based on the comparison.

* * * * *